(12) United States Patent
Dalla Betta et al.

(10) Patent No.: US 7,533,521 B2
(45) Date of Patent: May 19, 2009

(54) SYSTEM AND METHODS FOR IMPROVED EMISSION CONTROL OF INTERNAL COMBUSTION ENGINES USING PULSED FUEL FLOW

(75) Inventors: Ralph A. Dalla Betta, Mountain View, CA (US); Joel M. Cizeron, Sunnyvale, CA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/449,986

(22) Filed: Jun. 9, 2006

(65) Prior Publication Data

US 2006/0230748 A1    Oct. 19, 2006

Related U.S. Application Data

(63) Continuation of application No. 10/431,171, filed on May 6, 2003, now Pat. No. 7,082,753, which is a continuation-in-part of application No. 10/309,936, filed on Dec. 3, 2002, now Pat. No. 7,165,393.

(60) Provisional application No. 60/426,604, filed on Nov. 5, 2002, provisional application No. 60/337,023, filed on Dec. 3, 2001.

(51) Int. Cl.
*F01N 3/00* (2006.01)

(52) U.S. Cl. .............................. 60/286; 60/274; 60/295; 60/297; 60/303; 48/61; 48/197 R; 123/1 A; 123/3

(58) Field of Classification Search .................. 60/274, 60/275, 276, 286, 295, 297, 303; 48/61, 48/197 R, 198.3, 198.7, 198.8; 123/1 A, 123/3, DIG. 12
See application file for complete search history.

(56) References Cited

U.S. PATENT DOCUMENTS

| | | | |
|---|---|---|---|
| 6,083,425 A * | 7/2000 | Clawson et al. | ............. 252/372 |
| 6,161,378 A | 12/2000 | Hanaoka et al. | |
| 6,274,106 B1 | 8/2001 | Held | |
| 6,383,468 B1 * | 5/2002 | Schussler et al. | ............ 423/651 |
| 6,508,057 B1 * | 1/2003 | Bouchez et al. | ............... 60/286 |
| 6,521,204 B1 * | 2/2003 | Borup et al. | ................. 423/652 |
| 6,560,958 B1 * | 5/2003 | Bromberg et al. | ............. 60/275 |
| 6,637,189 B1 | 10/2003 | Boegner et al. | |
| 6,823,662 B1 | 11/2004 | Yamamoto et al. | |
| 6,887,436 B1 * | 5/2005 | Fisher et al. | ................. 422/177 |
| 7,056,480 B2 * | 6/2006 | Ogawa | ........................ 422/197 |

(Continued)

FOREIGN PATENT DOCUMENTS

| | | | |
|---|---|---|---|
| EP | 0893154 | | 8/2004 |
| JP | 03196839 A | * | 8/1991 |

*Primary Examiner*—Tu M Nguyen
(74) *Attorney, Agent, or Firm*—Paul V. Keller

(57) ABSTRACT

The present invention provides systems and methods to improve the performance and emission control of internal combustion engines equipped with nitrogen oxides storage-reduction ("NSR") emission control systems. The system generally includes a NSR catalyst, a fuel processor located upstream of the NSR catalyst, and at least one fuel injection port. The fuel processor converts a fuel into a reducing gas mixture comprising CO and $H_2$. The reducing gas mixture is then fed into the NSR catalyst, where it regenerates the NSR adsorbent, reduces the $NO_x$ to nitrogen, and optionally periodically desulfates the NSR catalyst. The fuel processor generally includes one or more catalysts, which facilitate reactions such as combustion, partial oxidation, and/or reforming and help consume excess oxygen present in an engine exhaust stream. The methods of the present invention provide for NSR catalyst adsorbent regeneration using pulsed fuel flow. Control strategies are also provided.

11 Claims, 10 Drawing Sheets

U.S. PATENT DOCUMENTS

| | | | |
|---|---|---|---|
| 7,101,531 B2 * | 9/2006 | Kamijo | 423/650 |
| 7,160,342 B2 * | 1/2007 | Grieve et al. | 48/198.1 |
| 7,235,217 B2 * | 6/2007 | Nguyen | 422/198 |
| 7,323,159 B2 * | 1/2008 | Ahluwalia et al. | 423/651 |
| 7,374,591 B2 * | 5/2008 | Sommer et al. | 48/198.7 |
| 7,442,217 B2 * | 10/2008 | Goebel et al. | 48/197 R |
| 2001/0052232 A1 | 12/2001 | Hoffmann et al. | |
| 2003/0079466 A1 | 5/2003 | Surnilla | |

* cited by examiner

SYSTEM AND METHODS FOR IMPROVED EMISSION CONTROL OF INTERNAL COMBUSTION ENGINES USING PULSED FUEL FLOW

CROSS-REFERENCE TO RELATED APPLICATIONS

This application is a continuation application of U.S. patent application Ser. No. 10/431,171, which was filed on May 6, 2003, which is a continuation-in-part of U.S. patent application Ser. No. 10/309,936, which was filed on Dec. 3, 2002, which claims the benefit of priority to U.S. Provisional Patent Application Ser. No. 60/337,023, which was filed on Dec. 3, 2001. U.S. patent application Ser. No. 10/431,171 further claims the benefit of priority to U.S. Provisional Patent Application Ser. No. 60/426,604, which was filed on Nov. 5, 2002, each of which is incorporated herein by reference in its entirety.

FIELD OF THE INVENTION

This invention relates generally to internal combustion ("IC") engines, and more particularly, to devices, systems, and methods for improving the performance and emission control of IC engines that produce nitrogen oxides ("$NO_x$") emissions. It further relates generally to emission control systems, catalytic reaction systems, and fuel processing.

BACKGROUND OF THE INVENTION

Efforts to improve air quality have lead to strict government issued emission controls and regulations. Over the past 30 years, the allowable emissions from spark ignited gasoline engines have been substantially reduced. In tension with the efforts to reduce emissions is a general desire for increased fuel efficiency. This is particularly a problem with diesel engines, which while being very efficient often produce very high emissions of both $NO_x$ and particulate matter ("PM"). Indeed, in order to be compliant with gasoline spark ignited engine regulations, the emissions from a modern diesel engine must be reduced by a factor of around 10 to 50, depending on specific engine type.

Lean-burn engines include both spark-ignition ("SI") and compression-ignition ("CI") engines. In comparison to conventional SI engines, lean-burn SI engines offer 20-25% greater fuel economy, while CI engines offer 50-100% greater fuel economy. CI engines are widely used throughout the United States in heavy-duty vehicles and their use in light-duty vehicles is expected to grow. CI engines are also widely used throughout much of the world in passenger vehicles, light and heavy-duty trucks, and electric power generators.

Currently, automotive emission control is based largely on three-way catalyst technology, which reduces the emissions of carbon monoxide ("CO"), unburned hydrocarbons ("UHCs") and $NO_x$. This technology can be highly effective for ordinary gasoline engines operating at stoichiometric, or near stoichiometric air/fuel ratios. However, three-way catalyst technology is generally not suitable to lean burn engines, which generate a very lean overall exhaust mixture containing a large excess of oxygen. This is because the excess oxygen in the exhaust impedes the reduction of $NO_x$, a major limitation of both lean-burn engines and TWC-based emission control technology. For example, in the case of lean-burn diesel engines, the emission control system must remove $NO_x$ and PM from an exhaust stream containing about 6-15% excess oxygen.

Many technologies have therefore been explored to address the problem of $NO_x$ removal from lean-burn engine exhaust. One such technology utilizes $NO_x$ storage-reduction ("NSR" or NSR-type) systems. This technology has been described throughout the scientific literature and is generally well known in the art. For example, description of this technology may be found in S. Matsumoto, CATTECH, Vol. 4, No. 2, pp. 102-109, 2000, and the references cited therein, all of which are hereby incorporated by reference in their entirety.

As described therein, a typical NSR catalyst has an adsorbent-catalyst system, providing the dual functions of reversible $NO_x$ storage or trapping, and $NO_x$ reduction. One component of the NSR catalyst reacts with $NO_x$ in the gas stream to capture it under oxidizing conditions or conditions where the exhaust stream contains excess $O_2$. This component is selected so that when the exhaust stream is made reducing, that is, containing excess reducing species, the $NO_x$ is released. The NSR catalyst also contains a $NO_x$ reduction catalyst that reacts $NO_x$ with a reducing agent under reducing conditions to form non-polluting $N_2$. When the exhaust stream is made reducing, the $NO_x$ is released and this $NO_x$ reacts with the reducing species on the $NO_x$ reduction catalyst to form $N_2$. One example of an adsorbent-catalyst system is the $Pt/Rh/Ba/TiO_2/ZrO_2/\gamma-Al_2O_3$ system, which has been used commercially in vehicles in Japan.

Main advantages of the NSR catalyst are its compatibility and effectiveness with fuel-efficient lean-burn IC engines; its commercial acceptance; its unneeded use of ammonia or urea as reducing agents; and its ability to obtain high $NO_x$ conversions when operated at ideal conditions. For example, $NO_x$ conversions of 90 to 100% have been achieved in tests of diesel engines under ideal conditions using diesel fuel as a reducing agent.

However, NSR technology has some serious disadvantages and limitations as well. During regeneration of the NSR catalyst, the environment of the NSR catalyst must be made rich to convert the trapped $NO_x$ to $N_2$ and to regenerate the catalyst. If the reducing environment in the exhaust were to be obtained by modifying the engine operation from lean to rich, then the engine cycle would be operating in a region where it was not designed to operate. For example a diesel engine, which usually operates without a throttle on the air intake, would now require a throttle to drive the air/fuel ratio into the rich regime. In addition, this would have to be done quickly and quite frequently, from about every 2 to 20 minutes.

Fuel may be injected into the exhaust stream and combusted on the NSR catalyst or on an upstream oxidation catalyst in order to both consume the oxygen and to produce the reducing environment. At high exhaust temperatures, this has been shown to give reasonable regeneration cycles and $NO_x$ conversion efficiency. At low load and low exhaust temperatures, however, this procedure does not work well since the catalyst is not sufficiently reactive with diesel fuel. In addition, the high temperatures produced could drive the NSR catalyst to an undesirably high temperature.

Another disadvantage of NSR technology is that NSR adsorbents are typically very sensitive to sulfur. The $NO_x$ adsorbent material can react with sulfur oxides contained in the fuel to form sulfates, as described for example in S. Matsumoto, CATTECH, Vol. 4, No. 2, pp. 102-109, 2000; K. Yamazaki et al., Applied Catalysis B: Environmental, Vol. 30, Nos. 3 and 4, pp. 459-468, 2001 and the references cited therein, all of which are hereby incorporated by reference in their entirety. These sulfates are not readily decomposed and slowly convert the $NO_x$ adsorbent to an inactive sulfate, reducing its trapping efficiency. Even with low sulfur fuel (e.g., in the range of 15 ppm) the NSR catalyst only lasts for about 500 to 1000 vehicle miles before its $NO_x$ trapping efficiency becomes significantly reduced. To produce a NSR catalyst that would last the 150,000 to 400,000 miles required by current and foreseeable emissions regulations, the NSR unit would have to be designed much too large to be conveniently utilized within the industry. While it has been found that the NSR catalyst unit can be desulfated by treatment in a reducing atmosphere at temperatures of 500-650° C., it is very difficult to operate an engine in a manner so as to produce this environment within the NSR trap unit itself.

Use of diesel fuel as a reductant by direct injection into the exhaust is not very effective at exhaust stream temperatures from 150-250° C., which covers a significant portion of the operating cycle of a diesel engine, including idle and low load. While high $NO_x$ conversions may be possible using a diesel reductant at high inlet temperatures (e.g., ranging from 250-300° C. or above), these temperatures are often unobtainable over a sufficiently wide spectrum of operating conditions to make this a useful approach. Other reducing agents, such as hydrogen, carbon monoxide, alcohols and some low molecular weight hydrocarbons (e.g., propylene), are more reactive at low temperatures and may provide better reducing capacities within a wider range of operating conditions. However, use of these materials would require the vehicle have an additional fuel source, posing significant infrastructure and design implications as well as increased costs. These disadvantages and limitations have largely prevented widespread commercial use and acceptance of NSR technology.

Published PCT patent application WO 01/34950 A1 by H. S. Hwang et. al., which is hereby incorporated by reference in its entirety, shows one approach to improving the regeneration of a NSR catalyst. This application describes a fuel processor unit that receives fuel and air and processes it over a catalyst to produce a mixture of partially reacted fuel and possibly some $H_2$ and CO in a system external to the exhaust system. The partially reacted fuel mixture is then injected into the exhaust stream when a need for NSR catalyst regeneration arises.

This approach has several disadvantages however. First, the processor is limited to producing the reducing agents, it does not aid in reducing the oxygen level in the exhaust. In addition, this device cannot provide a high enough exhaust temperature to facilitate either optimum NSR catalyst regeneration, or desulfation. Further, if the device is to be used only intermittently, the fuel and air must be operated intermittently. This may be very difficult since the fuel processor must be maintained at elevated temperatures to function properly. During idle or low load operation, the NSR catalyst may be regenerated only once every 10 to 20 minutes for optimum fuel economy. In addition, since the fuel processor must be maintained at elevated temperatures for very long periods, even when not needed, energy expenditure is significantly increased and fuel economy is adversely affected. Lastly, because partially processed fuel, $H_2$ and CO may be generated continuously, they must be stored until needed for the regeneration cycle. This complicates the overall system design. Thus, a great need remains for methods and devices that can overcome the disadvantages and limitations of the currently available NSR systems, and at the same time provide a practical solution to the current emissions and fuel efficiency problems.

BRIEF SUMMARY OF THE INVENTION

The present invention fills this need by providing systems and processes that enable NSR technology. In this way, large-scale commercial use of diesel and other lean-burn engines with NSR technologies is facilitated. This in turn helps to conserve petroleum and to reduce greenhouse gas emissions while ensuring compliance with strict environmental regulations.

Accordingly, it is an object of the present invention to provide improvements in the performance and emissions of lean-burn IC engines equipped with NSR or NSR-type emission control systems. It is a further object to provide a device capable converting a fuel, such as diesel or gasoline, into a reducing gas mixture containing CO and $H_2$ at a temperature compatible for use with NSR systems. It is yet another object to provide a reducing gas mixture capable of regenerating a $NO_x$ adsorbent, reducing $NO_x$ to nitrogen, and periodically desulfating a NSR-type emission control system catalyst. It is still a further object to provide a $NO_x$ reducing agent and adsorbent-catalyst desulfating agent that is more efficient than diesel fuel. It is still a further object to enable IC engines to be operated in continuous lean-burn mode, rather than intermittent lean/rich-burn mode. These and other objects and advantages will become apparent from the description set forth hereinafter and the drawings attached hereto.

In one aspect, the present invention fulfills these objects by providing a system for reducing $NO_x$ in an exhaust stream containing excess oxygen comprising, a NSR catalyst, a fuel processor, and at least one fuel injector port. The fuel processor is located at a position upstream of the NSR catalyst and comprises an inlet, an outlet, and at least one catalyst. In some variations, the fuel processor further comprises a sulfur-trapping agent.

Fuel is injected into the fuel injection port and reacts on the fuel processor catalyst to rapidly increase the temperature of at least a portion of the fuel processor catalyst and at least a portion of it is converted to $H_2$ and CO. In some variations, the injection of fuel is pulsed. In other variations, fuel is injected into the fuel processor to preheat the fuel processor catalyst.

In some variations the system further comprises a thermal mass having a heat capacity greater than that of the fuel processor. The thermal mass may for example be a PM filter, a monolithic structure, or may be a portion of the NSR catalyst or fuel processor. The system may optionally comprise a fuel preheater, a fuel vaporizer, a mixer, and a control system.

In another aspect, the present invention fulfills these objects by providing a method for regenerating an NSR catalyst adsorbent comprising the steps of providing an exhaust stream from an engine, injecting fuel into a position upstream of a fuel processor, optionally mixing the exhaust stream with the fuel, reacting the fuel and exhaust stream mixture within the fuel processor to generate a reducing gas mixture comprising CO and $H_2$, and introducing the reducing gas mixture into a $NO_x$ trap, whereby the adsorbent is regenerated by introduction of the reducing gas mixture.

In one variation the fuel is vaporized prior to injection. In another variation, the fuel is injected at an equivalence ratio greater than 1. In another variation, the fuel may be either gasoline or diesel fuel. In yet another variation, at least a portion of the catalyst is heated to at least 500° C.

In another aspect, the present invention fulfills these objects by providing a fuel processor unit for use with a NSR system comprising an inlet, an outlet, at least one catalyst, and at least one fuel injection port. The fuel injection port is located at a position upstream of the catalyst and facilitates the injection of fuel into the catalyst. At least a portion of the fuel reacts on the catalyst to rapidly raise the temperature oaf at least a portion of the catalyst, and at least a portion of the fuel is converted to $H_2$ and CO. In some variations, the fuel processor unit further comprises a mixer or additional catalysts.

In still another aspect, the present invention provides control strategies for use with the systems and methods of the present invention.

BRIEF DESCRIPTION OF THE DRAWINGS

The foregoing and other aspects of the present invention will best be appreciated with reference to the detailed description in conjunction with the accompanying drawings, wherein.

DETAILED DESCRIPTION OF THE INVENTION

Figure 1:
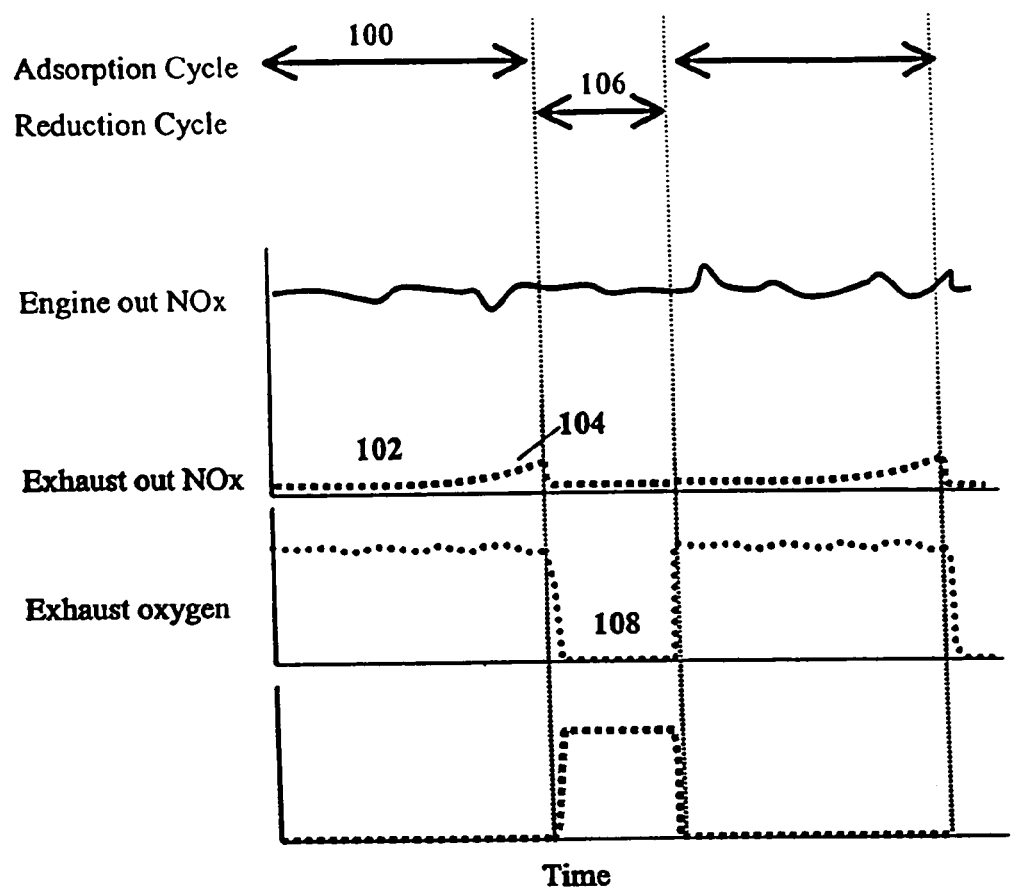
FIG. 1 depicts $NO_x$ adsorption and reduction in an illustrative NSR system.

In one aspect, the present invention provides a system for improving the performance and emission control of IC engines, and in particular, lean-burn engines equipped with a NSR catalyst. When reference is made herein to a "NSR catalyst," it should be understood that all systems having a $NO_x$ adsorbent-catalyst system are embodied thereunder. Making reference now to the drawings, wherein like numerals indicate like elements throughout the views, there is illustrated in FIG. 1, the operation of a typical NSR catalyst.

As shown therein, as exhaust gas flows through the catalyst during adsorption cycle 100, $NO_x$ is adsorbed in the presence of excess oxygen by an adsorbent. The NSR catalyst may be designed so that the adsorption is very efficient, with nearly complete adsorption of $NO_x$ from the exhaust stream, as shown by curve 102. The NSR catalyst typically comprises a canister situated in the exhaust unit to enable the exhaust gas to flow therethrough. Typical catalysts are honeycomb like, monolithic structures having the adsorbent and catalyst components coated onto their surfaces or walls.

As the adsorbent in the NSR catalyst becomes saturated with $NO_x$, the adsorption becomes less complete and the $NO_x$ level exiting the $NO_x$ trap begins to increase as shown by curve 104. At this point, the composition of the exhaust stream is changed from an oxidizing to a reducing state, and reduction cycle 106 begins. A reducing agent is then introduced and the oxygen level is reduced to zero as shown by curve 108.

In a reducing environment, the $NO_x$ is desorbed from the adsorbent and is reduced to nitrogen by the catalytic components of the $NO_x$ trap. This reaction generally occurs with sufficient speed so that reduction cycle 106 is relatively short while at the same time permits sufficient time to elapse so that a significant fraction of the $NO_x$ adsorption capacity is regenerated. The exhaust composition then reverts back to its normal oxidizing condition, and the entire cycle is repeated. Typically, adsorption cycle 100 lasts anywhere from 1 to 5 minutes at high load and possibly 20 minutes at low load or idle. Regeneration-reduction cycle 106 typically lasts 1 to 10 seconds and possibly longer depending on the time required to regenerate the NSR catalyst.

The reducing gas composition for regeneration-reduction is obtained by injection of extra fuel into either the engine cylinders late in combustion (i.e., during the end of the power stroke or during the exhaust stroke), or directly into the exhaust pipe upstream of the NSR system. The overall $NO_x$ conversion or removal performance of this technology is affected by the regeneration-reduction performance of the adsorbent-catalyst system. Thus, if the regeneration cycle is ineffective, the subsequent adsorption cycle is inefficient and the $NO_x$ levels exiting the exhaust are typically very high.

Figure 2:
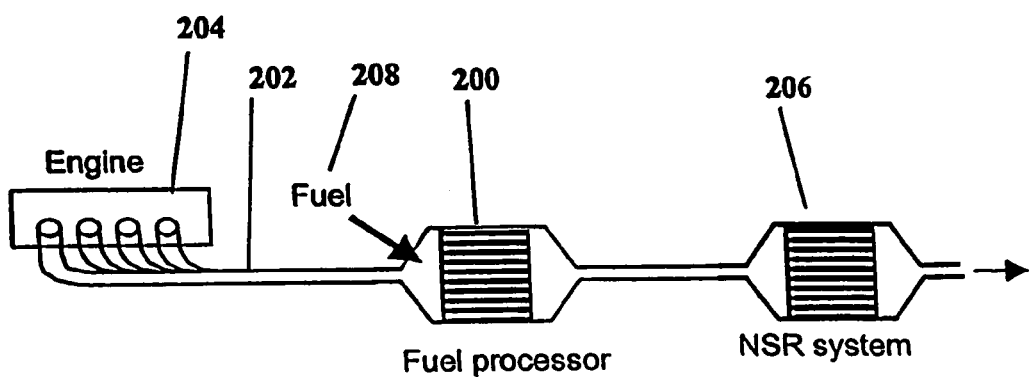
FIG. 2 illustrates one variation of the system of the present invention wherein a fuel processor is located upstream of a NSR system.

Turning now to FIG. 2, there is shown a general schematic of the system of the present invention. As illustrated therein, fuel processor 200 may be located at a position along exhaust pipe 202 at a distance between engine 204 and NSR system 206. In this way, the exhaust stream will flow first through fuel processor 200 and then through NSR system 206. Fuel processor 200 may be located together with NSR system 206 in a single housing structure, or it may not be. In one variation, as will be described in more detail below, fuel processor 200 is operated intermittently to periodically regenerate the NSR adsorbent of the NSR system 206. When regenerating the NSR adsorbent, fuel 208 may be injected into fuel processor 200, injected at a position upstream of fuel processor 200, or may be injected directly into both fuel processor unit 200 and at a position upstream thereof.

Figure 3:
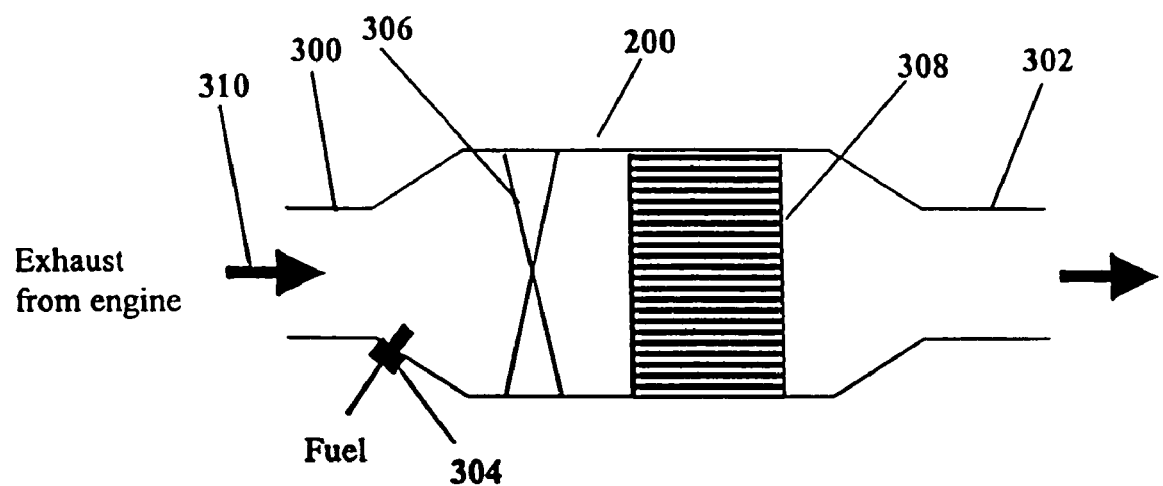
FIG. 3 illustrates one variation of the fuel processor of the present invention, wherein the fuel processor comprises a single catalyst.

In one variation, fuel processor 200 comprises at least one catalyst, as shown in FIG. 3. As illustratively shown therein, fuel processor 200 comprises inlet 300, outlet 302, and at least one catalyst 308. At least one fuel injection port 304 and an optional mixer 306 are located at a position upstream of the fuel processor. In addition, fuel processor 200 may further comprise a fuel preheater, fuel vaporizer, a secondary injection port for the introduction of air or additional fuel (not shown), and a control system (not shown).

As illustratively shown in FIG. 3, fuel processor 200 comprises inlet 300 for receiving exhaust gas mixture 310. Fuel injection port 304 is located at a position upstream of fuel processor 200 for receiving fuel therein. After the fuel is injected into port 304, it enters fuel processor 200 and combines with exhaust gas mixture 310. The fuel to be injected into port 304 may take the form of a vapor, a liquid, or a combination of the two. If the injected fuel is a liquid, then some or all of it may be vaporized when contacted by the hot exhaust gas mixture. Mixing may further accelerate this vaporization. Thus, exhaust gas mixture 310 and the injected fuel may pass through an optional mixer 306. Mixer 306 may be any suitable mixer that promotes mixing of gases and aids the vaporization of liquid droplets.

The mixture may be sufficiently uniform so that the resulting equivalence ratio ($\phi$) is within any desired limit, where the equivalence ratio is the fuel concentration divided by the theoretical fuel concentration needed to fully react all the oxygen present in the gas mixture to form $CO_2$ and $H_2O$. For example, if the fuel processor is to be used to reduce the oxygen concentration in the exhaust to zero before it enters the $NO_x$ trap, then the level of mixing will determine the required mixture equivalence ratio. If the mixer produces a mixture at the catalyst inlet of +/−10% uniformity then fuel may be added to give an equivalence ratio of 1.1 so that the lowest equivalence ratio at the catalyst is 1.0. Similarly, for the portion of the fuel processor operating rich to produce $H_2$ and CO, the mixture uniformity will likely be determined by the required equivalence ratio and the required temperature to obtain the necessary reforming performance. In general, mixture uniformity from +/−20% is desirable, while +/−10% is more desirable, and +/−6% is most desirable.

In one variation, a static (i.e., having no moving parts), in-line mixer that mixes the components into a relatively homogeneous stream is used. In this variation, the mixer acts by changing the flow of the gas stream components, thereby causing mixing of the inlet stream. Various types of static mixers are commercially available and may be used. For example, one type of static mixer has an array of intersecting channels that split the stream into portions, which portions are then rearranged and combined. Other types of mixers include swirlers and counter rotating swirlers, which impart a swirl to the gas mixture. The swirler may have a portion rotating in one direction and another portion rotating in the opposite direction. Pipe sections may also be used as mixers. For example, straight pipe sections with a length/inner diameter ratio ($L/D_i$) greater than 5 or bent pipe sections may be used.

Alternatively, the mixer may have moving parts such as fans, turbines, or acoustic energy input devices, which induce turbulence or mixing within the gas streams. Such mixers may be less desirable, however, since the moving parts may wear and require service and may also require a greater energy input. Evaluation of any improvement in mixing efficiency should be made before determining whether a non-static mixture is sufficiently advantageous to tolerate the additional design complexity and energy consumption.

In addition, it is possible for varnish or carbonaceous deposits to form on the parts of the mixer in contact with fuel spray, especially if the fuel has a high molecular weight and is prone to pyrolysis. Varnish is a hydrocarbon like coating formed by partial pyrolysis of the diesel fuel. Parts of the mixer may be coated with a catalyst capable of oxidizing these varnish or carbonaceous deposits. In this way, the catalyst prevents or removes the deposits, much like a continuous-cleaning or self-cleaning oven.

In one variation, fuel injection ports may be used as mixers. In one variation, the fuel injection ports are located upstream of the fuel processor in the exhaust pipe and a length of the exhaust pipe is used to mix the gas mixture uniformly. The section of pipe length necessary to perform this function is generally thought to be ten times the pipe diameter length. The injection ports may also be located upstream of a bend in the exhaust pipe to further mix the fuel and air. In some instances, it may be desirable to mix the fuel and air quickly or in a short distance prior to their introduction into the catalyst. This is because heavy fuels (e.g., diesel fuels) are prone to pyrolysis or decomposition and produce varnish or other deposits, which may in turn lead to the degradation of the system. In another variation the fuel injection ports of the engine are used as mixers.

The fuel and exhaust mixture then flow into catalyst 308 for reaction. A portion of the fuel reacts with oxygen, while the remaining fuel reacts with water to form carbon monoxide (CO) and hydrogen ($H_2$) by processes well known in the art. The $H_2$ and CO then flow out of catalyst 308 and out of the fuel processor via outlet 302. The $H_2$ and CO may then flow downstream to NSR system 206, as shown in FIG. 2. Since the gas mixture comprises a $H_2$ and CO reducing gas mixture, containing little or no oxygen, the NSR unit will be rapidly and efficiently regenerated. At the completion of this regeneration cycle, the fuel flow to the fuel processor is terminated and the system returns to adsorption mode.

Catalyst 308 may comprise a single catalyst unit or may comprise several catalysts in series. For example, a first catalyst may be designed primarily as a combustion catalyst with a catalyst composition selected to react with some of the fuel and oxygen to form carbon dioxide and water and generate heat. Excess fuel and/or fuel injected between catalyst units could then pass to a second catalyst unit where the excess fuel can react with water and carbon dioxide to form CO and $H_2$. This second catalyst can be designed primarily as a reforming catalyst for example. Alternatively, a single catalyst can be designed having an inlet section for oxidation and an outlet section for reforming. In this way, a single catalyst is provided that effectively functions as two separate catalyst units.

Catalyst 308 may comprise one or more metals or oxides as the active catalyst combined with a high surface area refractory support, many of which are well known in the art for oxidation of hydrocarbons. The catalyst may be applied as a washcoat, a porous coating typically comprising a mixture of a high surface area support and active catalyst elements. Alternatively, the coating may comprise a support with a porous structure that has a second oxide portion or a mixture of oxides active for the oxidation of hydrocarbons or carbon. The coating may be applied using any number of processes. For example, it may be applied using plasma flame spraying, chemical vapor deposition, electroplating, electroless plating, application of a sprayable sol (comprising a suspension of the catalyst particles in a liquid), or be applied by dipping the parts into a slurry. One example of a catalyst composition that may be used with the present invention is described in U.S. Pat. No. 5,232,357 by Dalla Betta et. al., which is hereby incorporated by reference in its entirety.

The fuel used in the fuel processor may be any fuel compatible with the unit. For example, it may be the same type of fuel as used in the engine. When the fuel is a liquid, such as diesel fuel or gasoline, the exhaust gas mixture may not be hot enough to vaporize the fuel completely. In these circumstances, the mixture temperature may be increased sufficiently to cause some portion of the fuel to react with the oxygen in the exhaust stream passing through the catalyst, thereby causing the catalyst temperature to increase. As fuel processor catalyst 308 increases in temperature, the remaining liquid fuel may be vaporized within the catalyst.

Alternatively, the fuel may be preheated so that it is more readily vaporized upon injection. An optional fuel heater may be positioned at any convenient location, either within the fuel processor unit itself, or any desirable position upstream thereof. The fuel may be injected either continuously or intermittently, for the duration of the regeneration cycle. In the case of continuous fuel injection, the rate and duration of the fuel flow controls the fuel quantity. In the case of intermittent fuel injection, the pulse frequency and pulse volume controls the fuel quantity.

Figure 12:
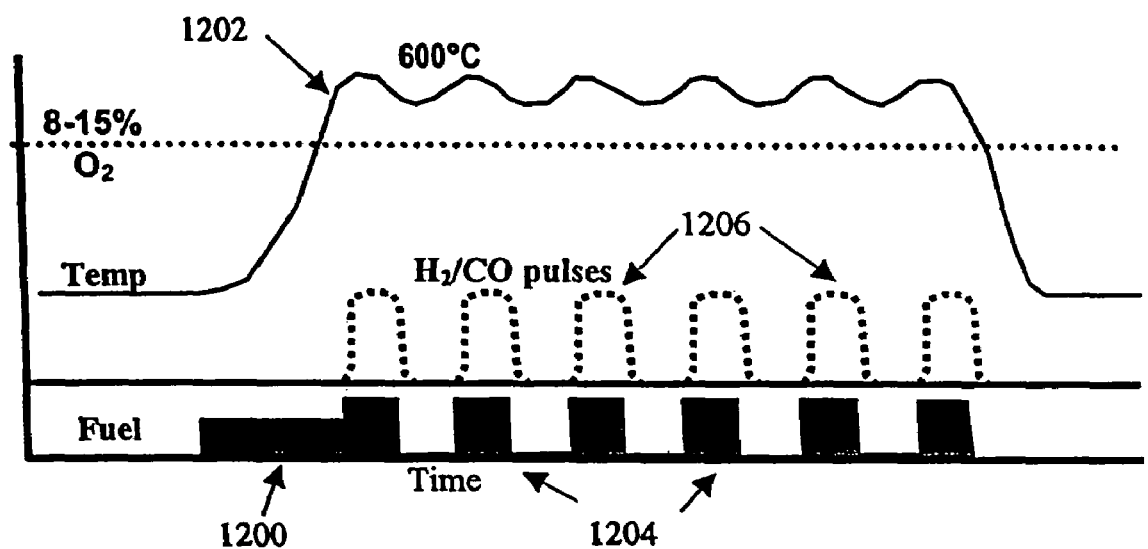
FIG. 12 illustrates one method of operating the system of the present invention using pulsed fuel flow.

The use of fuel pulsing can be advantageous when the inventive process is used in gas streams with higher levels of oxygen. As shown in FIG. 12, fuel may first be injected 1200 into the fuel processor in order to preheat the fuel processor catalyst to a desirable temperature 1202. For example, the fuel processor catalyst may be preheated to a temperature in the range of 500° C. (±50° C.) to 700° C. (±50° C.), and most often in the range of 600° C. (±50° C.). Fuel may then be injected in a pulsed manner 1204 so as to generate pulses of $H_2$ and CO 1206, which are then used to regenerate the NSR unit. The pulses may be of any duration, but should be sufficiently short so as to allow the fuel processor catalyst time to cool down in between successive pulses. If the fuel pulses are too long, the catalyst may overheat, since high levels of oxygen, when fully combusted, result in a large heat release.

Any number of pulses may be used, for example, 1 to 20 pulses, and more often, 5-10. FIG. 12 shows a long pulse of fuel to preheat the catalyst and then 6 large fuel pulses to generate 6 pulses of $H_2/CO$ 1206 to regenerate the downstream NSR catalyst. Similarly, the length of each pulse may be selected so that the catalyst temperature will remain high during the pulsing series, but will not become high enough so as to cause the catalyst to overheat. For example, the pulses could be from 0.1 to about 2 seconds in length. In addition, the time interval between pulses may be varied depending on the mode of engine operation, and the design of the fuel processing catalyst and the exhaust flow rate being treated. At low engine rpm where the exhaust flow rate is low, the pulses can be farther apart since the lower gas flow rate cools the catalyst more slowly. The pulses may be from 0.5 second to 20 seconds apart. At higher rpm where the exhaust flow rate is higher, the pulses may be closer together, from 0.1 to 3 seconds apart. This is often made possible by the use of a pressurized fuel injector, which may be electronically controlled, that enables the fuel injection to be controlled at frequencies of up to 200 Hz.

In general, this method of pulsed operation allows higher levels of oxygen in an exhaust stream to be used, without overheating the fuel processor catalyst. For example, this method of operation may be used with exhaust streams containing 5-20% oxygen, and more often with exhaust streams containing from 8 (±2%) to 15% (±2%) oxygen. The catalyst is allowed to cool between the pulses of rich fuel in order to prevent overheating.

The quantity of fuel injected is typically sufficient to react with all of the excess oxygen present in the exhaust stream and to generate the required amount of reducing gas mixture (CO and $H_2$) at the operating temperature of the NSR system. This quantity of fuel corresponds to an equivalence ratio ($\phi$) greater than 1.

Fuel is generally not injected during the $NO_x$ adsorption phase, which typically lasts 1 to 5 minutes at high loads and longer at low load or idle. Then fuel is injected again for about 1 to 10 seconds during the $NO_x$ regeneration-reduction phase, and the cycle is repeated as long as the engine is operating and is producing $NO_x$. The quantity and timing of fuel injection may be optionally controlled by a fuel processor control system, which may be linked to or be part of, the engine management system or engine control unit.

The $H_2$ and CO reducing agent can be formed by a variety of reactions. In one variation, a portion of the fuel is combusted to raise the catalyst temperature to approximately 500 to 700° C. and the remaining fuel reacts with $H_2O$ and $CO_2$ in the exhaust stream or formed by the fuel combustion to produce the desired $H_2$ and CO. Alternatively, the fuel, $O_2$, $H_2O$, and $CO_2$ can react simultaneously on the catalyst to yield the desired $H_2$ and CO.

Figure 4:
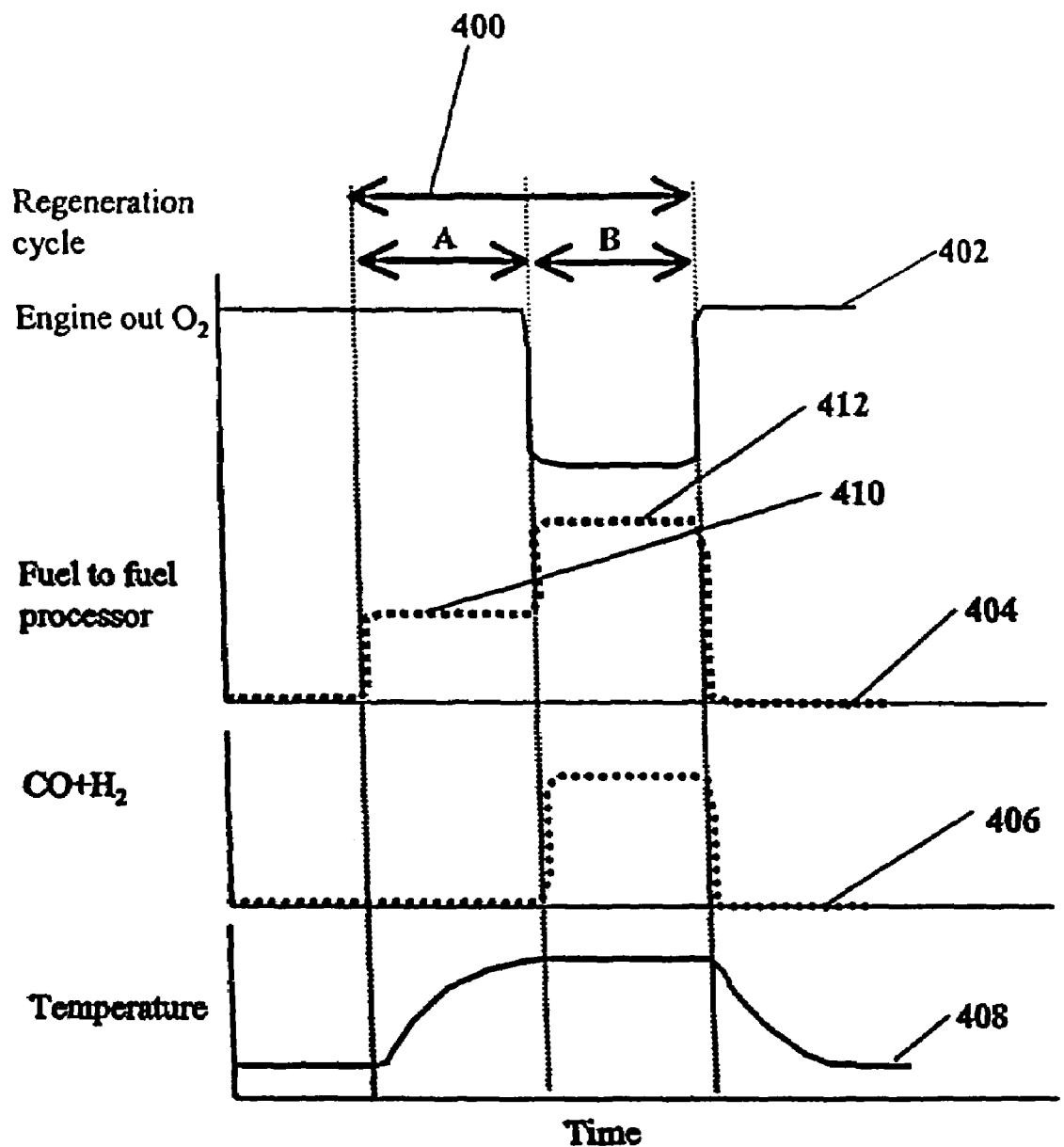
FIG. 4 provides a time-based graph illustrating one method of operating the fuel processor in accordance with the present invention.

The fuel processor can be operated in any of several modes. One mode of operation is shown for example, in FIG. 4. As shown therein, the regeneration cycle 400 consists of a heat up phase A and a reduction phase B. The oxygen concentration 402 from the engine, fuel flow to the fuel processor 404, CO and $H_2$ produced by the fuel processor 406 and temperature of the fuel processor catalyst 408 are indicated. At the start of heat up phase A, fuel is injected to the fuel processor at a rate indicated by 410. This heats the fuel processor catalyst to the desired temperature as shown in curve 408.

When the temperature of the fuel processor catalyst has reached the desired level, the fuel flow is increased 412 and the oxygen level 402 is decreased by partially throttling the airflow to the engine. The combination of decreasing the oxygen concentration and increasing the fuel concentration causes the overall mixture at the fuel processor catalyst to become rich, that is, having an equivalence ratio of greater than 1, and CO and $H_2$ is produced as shown in curve 406. When the $NO_x$ trap within the NSR system is fully regenerated, fuel input to the processor is terminated and the engine throttle reopened. One advantage of this cycle is that fuel consumption is minimized. In addition, since the engine is throttled only during the period in which CO and $H_2$ is generated, any negative effects on engine performance and drivability are minimized.

Alternative operating procedures are also possible. For example the fuel flow into the fuel processor can be immediately raised to that level required for reducing agent generation. Then when the fuel processor has achieved an adequate temperature, the engine may be throttled to produce an overall reducing mixture of CO and $H_2$. This can facilitate faster fuel heat up of the fuel processor catalyst since the amount of fuel combustion is higher. However, particular care should be taken in order to avoid overheating the catalyst, thereby deactivating it.

During the regeneration cycle, the outlet gas stream from the fuel processor is free of oxygen, including oxygen that might bypass catalyst 308. This is because this oxygen will mix with the reducing gas mixture and react on the NSR catalyst thus reducing the effectiveness of the regeneration process. In addition, the engine operating procedure can take a number of forms. Rather than throttling the engine to reduce the exhaust oxygen concentration, the exhaust gas recirculation system ("EGR") flow can be increased, thus causing the exhaust oxygen level to decrease. Alternatively, the amount of fuel injected into the engine by the engine fuel injectors can be increased. In addition, a combination of these methods or other methods can be used to decrease the exhaust oxygen level.

Figure 5:
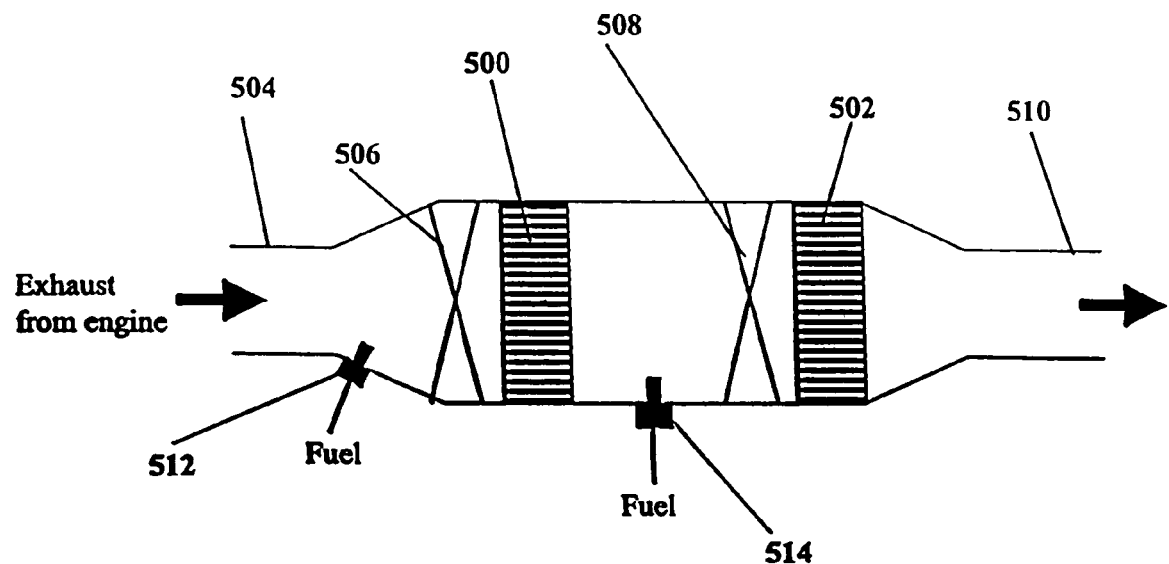
FIG. 5 illustrates one variation of the present invention wherein the fuel processor comprises two catalysts in series.

In one variation, the fuel processor comprises catalysts in series. In this variation, an oxidation catalyst is positioned upstream of a reforming catalyst as shown in FIG. 5. As shown therein, fuel processor unit 200 comprises oxidation catalyst 500 upstream of reforming catalyst 502. The exhaust gas flow enters the fuel reformer through inlet 504 and passes through mixer 506, oxidation catalyst 500, second mixer 508, reforming catalyst 502 and then through outlet 510.

In this variation, fuel may be injected via fuel injector 512 and be reacted on oxidation catalyst 500 to heat up the reforming catalyst 502. At any desirable time, fuel may also be injected via fuel injector 514 to further increase the fuel/air ratio to reforming catalyst 502 so that reforming can occur to produce CO and $H_2$. One advantage of this variation is that the functions of the oxidation and reforming catalysts are separated. In this way each catalyst may perform their function very efficiently.

For example, during operation, oxidation catalyst could be configured to operate under constant conditions of excess oxygen (equivalence ratio less then 1.0), thereby facilitating high activity and low deposition of carbon or hydrocarbons. Additionally, since reforming catalyst 502 may be separately fueled via one or more injectors at a position near fuel injector 514, the fuel can be added once the temperature of the reforming catalyst has reached its optimal level. In addition, having a separate oxidation catalyst enables its placement close to the engine, thereby facilitating its operation at higher exhaust gas temperatures. This in turn helps provide better operation at idle and at low ambient conditions.

The two catalysts in series in this variation may have any number of configurations. For example, the catalysts may be located at a distance separate from one another and have separate upstream injectors and mixers. Alternatively, the two catalysts may be located within a single unit. Having the catalysts located within a single unit has the advantage of making each system easily replicable, thus providing a manufacturing advantage.

Figure 6:
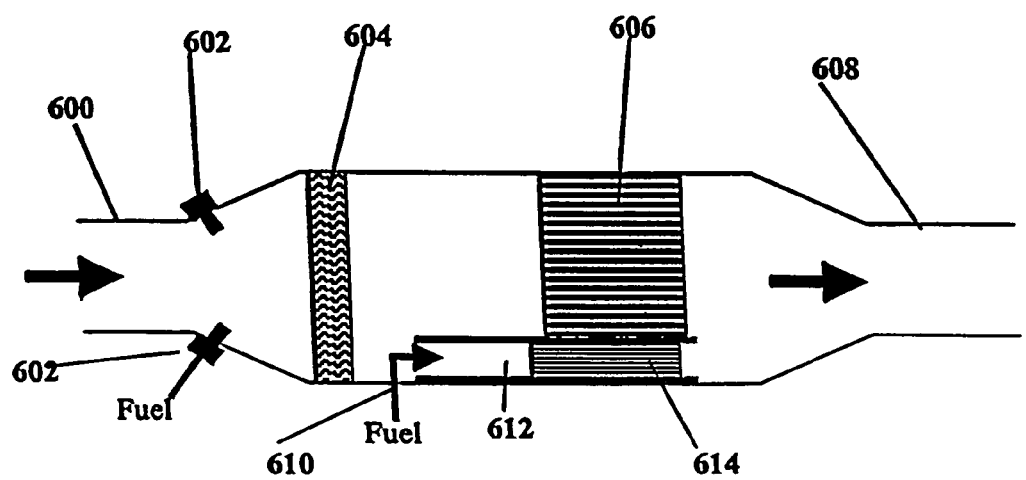
FIG. 6 illustrates one variation of the present invention wherein the fuel processor comprises two catalysts in parallel.

In another variation, the catalysts are in parallel, as shown by FIG. 6. The exhaust gas enters through port 600. Fuel may be injected via fuel injectors 602 where it is then mixed with the exhaust gas by mixer 604. The fuel and exhaust mixture then passes through catalyst 606 and outlet 608. A portion of the exhaust mixture passes through passage 612 and then through catalyst 614 and on to common outlet 608. Catalyst 606 is an oxidation catalyst and catalyst 614 is a reforming catalyst or combination combustion and reforming catalyst that has separate fuel injector 610.

In this variation, fuel is first added to fuel injector 610, which heats up reforming catalyst 614 to the desired temperature. When the temperature of catalyst 614 is within the desired range and a reducing mixture is required, fuel is injected via injectors 602 at an equivalence ratio close to 1.0. This consumes the oxygen in the main exhaust flow. Optionally, additional fuel may be added via injector 610 to make the equivalence ratio of the mixture at catalyst 614 above 1.0 and to produce CO and $H_2$. It should be noted that the equivalence ratio of the mixture at catalyst 614 will increase when fuel is injected through injectors 602. This is because the fuel is mixed with the portion of the exhaust flow that is flowing to catalyst 614, making the fuel composition at catalyst 614 the sum of the equivalence ratio from injectors 602 and 610.

The overall system design may be modified in any number of ways. For example, the system may be modified so that fuel from injectors 602 is not mixed with the exhaust flow that goes to catalyst 614. Alternatively, the catalysts may be located at positions separate from one another. For example, they may be located in separate units and have separate fuel injectors and mixers.

One advantage of the parallel configuration illustrated by FIG. 6 is that the reforming catalyst can be preheated to a high temperature by applying fuel only to the section nearby. If the size of catalyst 614 is small relative to catalyst 606 and the fraction of exhaust flow through 614 is small compared to 606, then the amount of fuel used to heat reforming catalyst 614 to the desired reforming temperature would be minimized. Also, catalyst 614 can be designed with a very small thermal mass so that heat up occurs quickly, further minimizing fuel expenditure.

On the other hand, it may be desirable that the downstream NSR system catalyst not be heated too high in temperature since this may damage it or drive it out of its desired operating range for adsorption. This may be accomplished by increasing the thermal mass of catalyst 606 so that when fuel is added to injectors 602 to remove the oxygen from the main exhaust flow, the catalyst and the exit gas flow from 606 rises slowly. Alternatively, a thermal mass may be placed downstream of the fuel processor unit to absorb the heat from the fuel processor outlet stream and reduce the gas stream temperature prior to entering the NSR system.

Another alternative configuration is to have a bypass such that the exhaust flow can bypass the fuel processor unit during the lean or trapping portion of the cycle. This would prevent the exhaust flow from cooling the hot fuel processor catalyst and thus require less fuel to bring the fuel processor catalyst back up to a temperature above 500° C. This would decrease the fuel penalty associated with the operation of the fuel processor and the NSR catalyst. The bypass may comprise a pipe or duct allowing the exhaust to flow around the fuel processor system, and a valve, for damper to direct the exhaust flow either through the fuel processor catalyst or around the fuel processor catalyst.

The catalysts of the present invention may be composed of any suitable material. For example, they may be composed of pellets or beads in a container, or may be monolithic honeycomb type units. A monolithic honeycomb unit may be desirable because vehicle vibration may cause abrasion and loss of pellet or bead material. Additionally, the monolithic units typically have a lower pressure drop for the flowing exhaust stream. Any monolith may be used. For example, the monolith may be ceramic or may be metal and may have a variety of cell sizes and shapes. Determination of the cell size and shape is dependent on the desired surface area and pressure drop, as well as the relevant heat and mass transfer coefficients. For example, it may be desirable that the fuel processor catalyst have a low heat capacity so it can heat up quickly. Similarly, it may be desirable that the fuel processor catalyst have a low pressure drop so that the overall pressure drop of the entire system does not present a hindrance to operation or reduce the efficiency of the engine.

When a monolithic structure is used for the catalyst substrate, its external or wall surfaces may be coated with a layer of catalyst. This washcoat may comprise a porous inert oxide such as alumina or zirconia and have a highly exposed surface area. This oxide support may contain additional components active for oxidation or reforming depending on the desired function. Preparation and composition of various monolithic catalysts for use with the present invention are described in U.S. Pat. Nos. 5,183,401, 5,259,754, and 5,512,250 to Dalla Betta et. al., each of which are hereby incorporated by reference in their entirety.

The oxidation catalyst may comprise any catalyst capable of oxidizing hydrocarbons. For example, the oxidation catalyst may comprise elements selected from any of Groups VI, VII, VIII and IB of the periodic table of the elements. The more active catalytic elements may be selected from the group Pd, Pt, Ir, Rh, Cu, Co, Fe, Ni, Ir, Cr, and Mo. In some instances, it may be more desirable to use Pd, Pt, Rh, Co, Fe, or Ni, which may be used separately or in combination and may further exist as the element or the oxide in actual use.

One property of the oxidation catalyst that may be desirable is that it has good catalytic activity at very low temperatures. In this way, oxidation can be initiated at low exhaust temperatures without modification of the system design. This property is often referred to as light off temperature, or the temperature at which the fuel and oxygen in the exhaust begins to react. This typically requires that the temperature be below 250° C. and more typically below 150° C.

The oxidation catalyst may be deposited on supports comprising aluminum oxide, silicon oxide, zirconium oxide, or mixtures and combinations thereof, or mixtures or combinations thereof with additional components or elements.

Examples are cerium zirconium oxide mixtures or solid solutions, silica alumina, Ca, Ba, Si, or La stabilized alumina, as well as other supports well known in the art. Since diesel fuel with a high molecular weight has a propensity to pyrolyze at high temperatures, the catalyst may also contain catalytic components active for steam cracking of the hydrocarbon fuel. Possible additives may include basic oxides such as calcium oxide, barium oxide, other alkali or alkaline earth oxides and rare earth oxides. The catalyst can be made by impregnating Pd, Pt or any other active catalyst within a porous support such as alumina or zirconia. The metal loading could be in the range of 0.1 to 20% by weight, and more desirably, in the range of 1 to 10% by weight. Several illustrative catalysts that may be used with the present invention include those described in U.S. Pat. No. 5,232,357 to Betta et. al., which is hereby incorporated by reference in its entirety.

The reforming catalyst may similarly use a high surface area support with added active components. For example, the reforming catalyst may comprise components Ni, Rh, Pd, Pt. The catalyst may be selected so that it is capable of remaining stable under normal lean oxidizing conditions and then responding very quickly to the addition of fuel so that $H_2$ and CO are thereby reformed. In this respect, it may be desirable to use Pt, Pd and Rh supported on a porous oxide support.

For example, a typical reforming catalyst may comprise 1% Rh by weight supported on a porous zirconium oxide substrate. This may be accomplished by dissolving rhodium trichloride in water and then impregnating the solution onto a solid zirconium oxide substrate having a high surface area (e.g., ranging from 15 to 150 $m^2/g$). The rhodium concentration may typically be in the range of 0.1 to 20% by weight of the total washcoat catalyst solid. More typically, the rhodium concentration may be in the range of 1 to 10% of the total washcoat loading. The washcoat may be coated onto the interior channels of a monolithic honeycomb structure at a loading thickness of 1 to 50 $mg/cm^2$ or more typically, in the range of 5 to 15 $mg/cm^2$. Pd or Pt catalysts may be prepared in a similar manner.

The oxidation and reforming catalysts may be combined in the same monolithic unit by combining in the washcoat both the oxidation and reforming components. For example, the active oxidation catalyst Pd and the active reforming catalyst Rh may be combined on a zirconia support to form a catalyst having the oxidizing activity to react the fuel with the oxygen and the reforming activity necessary to reform the remaining fuel to CO and $H_2$. Alternatively, the Rh component may be coated onto the monolithic substrate and calcined or fixed. Separately the Pd may be coated onto a high surface area support and calcined or fixed. These catalysts may also be mixed together to form a Pd/Rh catalyst and this mixed catalyst then coated onto the monolithic substrate.

In one variation, a thermal mass is used to help control the system operation, and in particular, to help moderate the temperature between the fuel processor and the $NO_x$ trap catalyst. This may be important because while the optimal operating temperature range for the fuel processor may be quite high, the optimal operating temperature range for the NSR system might not be. This may be because the $NO_x$ trap catalyst may be deactivated at high temperatures. Any number of thermal mass configurations are possible for use with the present invention and any number of thermal masses may be employed.

In one variation, the thermal mass of the fuel processor catalyst itself is selectively controlled. For example, it may be desirable that the catalyst heats up as rapidly as possible to consume as little fuel as possible. This typically involves controlling the thermal mass of the fuel processor catalyst, so that it is as relatively small. In another variation, a thermal mass may be placed downstream of the fuel processor to absorb the heat it releases in order to help prevent the overheating of the NSR system. This thermal mass may be a PM filter or soot trap placed between the fuel processor and NSR system or may be a separate thermal mass component. When a soot or PM filter is placed between the fuel processor and the NSR system as the thermal mass, the NSR system may be maintained at a constant temperature. One advantage of this design is that the heat generated by the fuel processor may be used to heat up and regenerate the particulate trap by helping to burn off the carbonaceous soot.

The thermal mass may be made of any suitable material. For example, it may be ceramic or may be metal. It can have a high heat capacity and a low pressure drop to ensure that the pressure drop across the entire system does not hinder system operation. The optimal range of thermal mass is a function of at least the gas flow rate and the desired temperature rise, and thus may be selectively controlled. In another variation, the NSR system itself may be designed with a high thermal mass.

Figure 7:
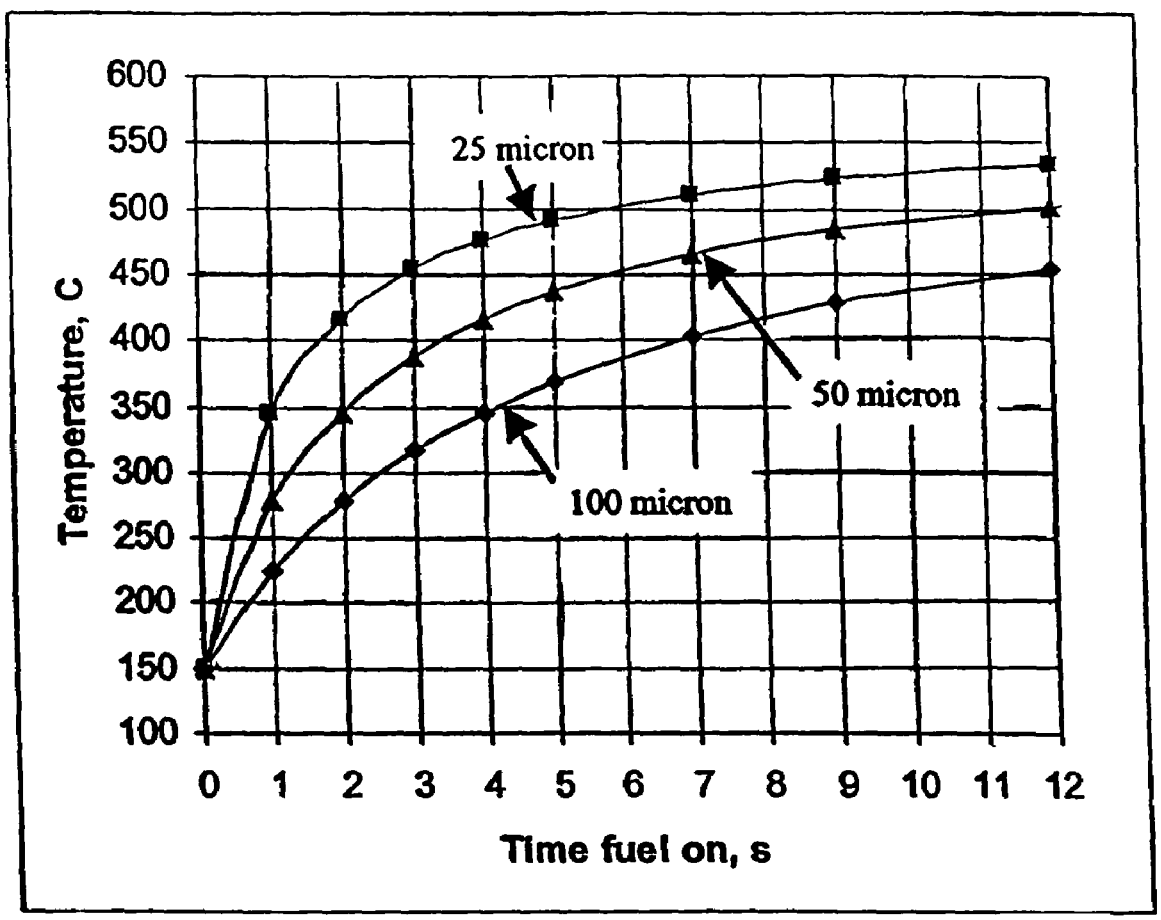
FIG. 7 provides an illustrative set of thermal response curves for fuel processors having different thermal masses.

FIG. 7 provides results of a computer simulation of catalyst heat up during the combustion of a fuel and air mixture. The following assumptions were made: the energy release required was for complete combustion of diesel fuel; the energy of the combustion was used to heat the gas mixture flowing through the catalyst and to heat the catalyst itself; there was good heat transfer between the gas and the catalyst; and the gas flow rate was typical of a catalyst unit sized for a vehicle. As shown in FIG. 7, the catalyst unit heats up rapidly once the fuel is turned on. At a metal monolith wall thickness of 100 microns, the catalyst unit reaches 450° C. in about 12 seconds. At a wall thickness of 50 microns it reaches 450° C. in about 6 seconds and at a wall thickness of 25 microns, it reaches 450° C. in about 3 seconds. Thus, for rapid heat up, a low wall thickness with a resulting low thermal mass is desirable. However, it should be noted that there may be other design considerations that may influence the selection of the wall thickness or thermal mass. These include the mechanical durability of the catalyst and the resistance to oxidation of the metal.

Typical wall thickness for a metal monolithic reforming catalyst unit would be in the range of 10 to 200 microns, and more typically 25 to 50 microns. The oxidation catalyst unit in the parallel configuration of FIG. 6, or a thermal mass in a series configuration, could be substantially thicker, typically 50 to 500 microns and more typically 100 to 200 microns. In addition, as discussed above, while it may be desirable to have the reforming catalyst heat up rapidly to generate hydrogen quickly, it is often not desirable to have the oxidation catalyst heat up too rapidly since this may overheat the downstream NSR catalyst.

In another aspect, the present invention facilitates desulfation of a $NO_x$ trap. Sulfur in engine fuel produces sulfur oxides, $SO_2$ or $SO_3$, in the exhaust system. These sulfur oxides ("$SO_x$") can react with the components of the trap to form sulfates, which in turn can deactivate the NSR system. While typical levels of sulfur in fuel are relatively low, making the deactivation of the trap take anywhere from days to weeks (corresponding to 100's to 1000's of miles of engine usage), the trap must be able to work far longer than this. The system and methods of the present invention can thus be used to desulfate the trap.

In one variation this is accomplished by the incorporation of a sulfur trapping material in at least a portion of the fuel processor. For example, the sulfur trapping material may be included as a composition of the fuel processor catalyst. This sulfur trapping material traps the $SO_2$ or $SO_3$ in the engine exhaust before it can reach the downstream NSR catalyst and, therefore, prevents deactivation of the NSR catalyst.

However, if a sulfur trapping material in used in combination with the fuel processor, the fuel processor will likely become saturated. If this occurs, the fuel processor should be regenerated to ensure continued useful operation. This regeneration may, for example, be done during the rich cycle when fuel is injected into the fuel processor. When the fuel processor catalyst is heated to a high temperature and the mixture goes rich, any trapped $SO_2$ and $SO_3$ will be released into the exhaust gas stream and pass out of the fuel processor. Since the released sulfur passes through the NSR catalyst during this rich phase, it will not poison the NSR catalyst.

The sulfur trapping material can be incorporated into the fuel processor catalyst in any number of ways. For example, it can be uniformly distributed within the catalyst layer, or it can be included as a separate layer, either at the side closest to the flowing gas stream or at the side closed to the catalyst support wall. The sulfur trapping material may also be a band located at the outlet end of the fuel processor catalyst where it would be exposed to the $H_2$ and CO generated by the fuel processor. The sulfur trapping material may also be a separate catalyst unit positioned downstream of the fuel processor catalyst. It is often most desirable that the sulfur trapping material is a catalyst band located at the outlet of the fuel processor catalyst, or that the sulfur trapping material is a separate catalyst downstream of the fuel processor catalyst.

In another variation, desulfation of the system is accomplished by operating the oxidation portion of the fuel processor to produce an outlet gas stream having a temperature in the range of 500 to 800° C. This in turn heats the downstream NSR system to a temperature in the range of 500 to 700° C.

When the NSR system is at the desired temperature, the fuel flow to the fuel processor and the engine throttle may be adjusted to produce $H_2$ and CO and reduce the oxygen concentration exiting the fuel processor to zero. This reducing gas mixture will then regenerate the $NO_x$ trap by decomposing the sulfates and other species that have caused its deactivation. This hot reducing gas mixture can be maintained until the regeneration is complete. In one variation, the regeneration temperature range for the NSR system is typically from about 100 to 800° C. and more typically, from about 500 to 700° C. In addition, the $H_2$ and CO reducing agent can be fed to the NSR catalyst for regeneration as a continuous long reducing pulse or as many short pulses.

In one variation, a control processor or control system may be used to control various aspects of the present invention. Any number of control strategies may be employed. For example, a control system may be used to map $NO_x$ output versus a given engine operating condition, such as load or speed. In this way, the $NO_x$ collected by the NSR trap may be estimated and as the trap reaches capacity, the $NO_x$ regeneration cycle may be initiated. Alternatively, a $NO_x$ sensor may be placed downstream of the NSR trap. In this way, once the sensor perceives that the $NO_x$ trap has reached capacity (e.g., by measuring breakthrough $NO_x$ levels), the regeneration cycle may be initiated.

Similarly, a control system may be used to monitor and control any or all system temperatures. Illustrative temperatures that may be controlled include inlet and outlet gas mixture temperatures, fuel input temperature, and catalyst temperature. For example, the reformer catalyst temperature may be monitored and controlled via a thermocouple or other temperature-sensing device placed near the outlet of the catalyst.

In a like manner, the temperature at the outlet of the fuel processor can be measured and monitored using a thermocouple. The temperature may be controlled by adjusting the fuel flow to the fuel processor while leaving the oxygen level in the exhaust constant. Alternatively, the temperature may be controlled by keeping the fuel flow to the fuel processor constant while adjusting the oxygen level, for example, by throttling the engine. Yet another alternative is to adjust both the fuel flow to the fuel processor and the $O_2$ level. This would allow the system to control both the fuel processor outlet temperature, and the equivalence ratio. In this way, the level of $H_2$ and CO may be effectively controlled.

The fuel processor temperature may be monitored by measuring the gas temperature at the outlet or by measuring the actual temperature of the catalyst itself. To minimize fuel usage by the fuel processor unit, a combustibles sensor, or $H_2$ or CO sensor may be placed downstream of the NSR trap unit to sensor the breakthrough of $H_2$ and CO reducing agent. This in turn signals the control system to stop the regeneration cycle.

If the fuel processor unit is used to desulfate the NSR trap unit, then it may be desirable to measure the temperature at the outlet of the fuel processor unit to limit the operating temperature to insure durability. In addition, the temperature at the outlet of the NSR trap unit may be measured to ensure that the NSR unit is at the desired temperature for regeneration. In addition, the temperature of the fuel processor unit may be modulated to obtain the desired temperature of the NSR unit for proper desulfation.

A control system may also be used to control the equivalence ratio. For example, when $H_2$ and CO are to be generated by the fuel processor reformer, the equivalence ratio at the inlet to the reformer catalyst can be controlled by changing the fuel flow or by throttling the airflow to the engine. More specifically, at normal operating engine airflow, fuel may be added to the reformer catalyst until the temperature is within the range required for reforming the fuel to $H_2$ and CO. At this point, the engine airflow can be throttled to reduce the airflow and $O_2$ concentration in the exhaust. This in turn will increase the equivalence ratio at the catalyst and drive it into the rich region to generate $H_2$ and CO. It is also possible to adjust the fuel flow to the reformer to adjust the equivalence ratio or to adjust both the engine throttle and the fuel flow to obtain the desired reformer equivalence ratio.

The equivalence ratio at the reformer and at the oxidation catalyst can be calculated from a number of engine parameters, including engine RPM and throttle setting (which in turn provides engine air flow), engine fuel flow, and fuel processor fuel flow(s). Alternatively, the exhaust $O_2$ level can be measured using an $O_2$ sensor in the exhaust upstream of the fuel processor and combined with the fuel processor fuel flow to calculate equivalence ratios.

One illustrative control strategy that may be specifically employed comprises the following steps: (1) adding fuel under normal operating conditions (for example, approximately 8-15% $O_2$) to heat the fuel processor catalyst to operating temperature; (2) adjusting the engine such that the oxygen concentration in the exhaust is between 4-6%; (3) adjusting the fuel to achieve the desired equivalence ratio (for example by exhaust gas recirculation or by throttling the intake air to the engine); (4) increasing the fuel flow rate so that an equivalence ratio >1 is obtained (for example, in the range of 2-5) or if the fuel flow rate is already sufficiently high, lowering the exhaust $O_2$; (5) maintaining conditions until the $NO_x$ trap is regenerated; (6) turning the fuel off and resuming normal engine operation.

Another illustrative control strategy that may be specifically employed comprises the following steps: (1) starting the fuel flow into the fuel processor and at the same time lowering the engine exhaust $O_2$; (2) adjusting the fuel flow rate after the fuel processor has reached a desired temperature so that a desired equivalence ratio is obtained; (3) maintaining the fuel flow until the $NO_x$ trap is regenerated; (4) turning the fuel off and resuming normal engine operation.

In combination with either of the two specific strategies set forth above, the exhaust temperature into the fuel processor could be adjusted by changing the engine operating conditions. For example, if the exhaust temperature at the inlet of the fuel processor is too low to obtain reaction between the fuel and the exhaust $O_2$, then the engine operation can be changed to increase the exhaust temperature. Possible engine changes include decreasing the engine intake air, increasing the amount of EGR, or bypassing a turbocharger. Similarly, a temperature measurement may be used to control the exhaust gas temperature. For example, the temperature at the inlet or outlet of the fuel processor may be measured and used as an indicator of the exhaust gas temperature. In this way, the exhaust temperature can be controlled.

A model based control strategy for use with the present invention may also be used as follows. To maximize the fuel economy of the NSR catalyst system, the regeneration cycle can be performed only when the NSR $NO_x$ adsorbent has reached a high level of saturation. This would help minimize the frequency of regeneration and the fuel cost associated with the regeneration. From rig testing of the catalyst or from controlled engine tests, maximum loading of the NSR $NO_x$ adsorbent for example in moles of $NOx(ML_{NOx})$ may be determined. During actual use of the NSR catalyst, the total flux of $NO_x$ into the NSR catalyst may be estimated from a measurement of the $NO_x$ concentration at the catalyst inlet using a $NO_x$ sensor positioned in the exhaust stream. This exhaust $NO_x$ concentration ($C_{NOx}$) can be combined with the exhaust flow rate ($F_{exh}$) in a mathematical function to calculate the total amount of $NO_x$ flowing through the NSR catalyst ($L_{NOx}$) by integrating over time (t) Eqn. 1.

$$L_{NOx} = f(C_{NOx}, F_{exh}, t) = \Sigma f(C_{NOx}, F_{exh}) \qquad \text{Eqn. 1}$$

As the value of $L_{NOx}$ attains a preset fraction of the value of $LM_{NOx}$, the regeneration cycle can be initiated. For example, prior testing may be used to establish that desirable $NO_x$ control may be attained by the NSR catalyst if the level of $NO_x$ saturation is below 80%. In this case, when $L_{NOx}$ is 80% of $ML_{NOx}$, the regeneration cycle is started. It should be noted that the ratio of $L_{NOx}$ to $ML_{NOx}$ when regeneration is initiated could be a function of average exhaust temperature during the $NO_x$ adsorption period, rate of $NO_x$ generation, average engine load, or other parameters that may affect the capacity of the NSR catalyst $NO_x$ adsorbent. In addition, since the NSR adsorbent may degrade with time, $ML_{NOx}$ may be a function of total catalyst operation time such as engine hours, vehicle miles or even integrated total $NO_x$ produced by the engine. Also, as described below, the exhaust $NO_x$ concentration and the exhaust flow rate and other parameters could be estimated from engine operating parameters.

The fuel flow to the fuel processor may be controlled to give either a desired heat release rate or a desired equivalence ratio. In the first case, the fuel flow rate ($F_{fuel}$) may be a function of the exhaust temperature at the fuel processor inlet ($T_{FP,in}$) the total exhaust flow rate ($F_{exh}$) and several fixed parameters such as the fuel processor catalyst mass, desired rate of heating and heat of combustion of the fuel and other system constants (SC) that can vary by engine type, catalyst size, etc. This functional relationship is shown in Eqn. 2.

$$F_{fuel} = f(T_{FP,in}, F_{exh}, SC) \qquad \text{Eqn. 2}$$

If the fuel flow to the fuel processor is controlled to a desired equivalence ratio, then the fuel flow will also be a function of the $O_2$ concentration in the exhaust stream ($E_{O2}$) and the desired equivalence ratio for operation of the fur processor ($R_{eq}$) as shown in Eqn. 3.

$$F_{fuel} = f(T_{FP,in}, F_{exh}, SC, E_{O2}, R_{eq}) \qquad \text{Eqn. 3}$$

The $O_2$ concentration in the exhaust stream can be measured using a sensor positioned in the exhaust stream.

Alternatively, the parameters in Eqn. 1 through 3 can be calculated or estimated from operating parameters of the engine. For example, the exhaust flow rate may be a function of the engine inlet air flow rate, which may be measured as part of the engine control system. Alternatively, the exhaust flow rate could be calculated from certain engine parameters such as engine rpm and turbocharger boost pressure. Thus, exhaust flow can be expressed as a function of engine rpm ($E_{rpm}$) and engine turbocharger boost pressure ($E_{boost}$) as shown in Eqn. 4. Other engine parameters may also be included if needed to obtain a more accurate estimation of exhaust flow rate.

$$F_{exh} = f(E_{rpm}, E_{boost}) \qquad \text{Eqn. 4}$$

Similarly, it may be desirable to calculate exhaust oxygen level or exhaust $NO_x$ level rather then use sensors in the exhaust stream since such sensors are expensive and may not have good durability. The concentration of $O_2$ or $NO_x$ in the exhaust can be estimated from one or more engine operating parameters such as engine fuel flow rate ($E_{fuel}$), engine rpm ($E_{rpm}$), engine output torque ($E_{torque}$), turbocharger boost pressure ($E_{boost}$), engine EGR flow ($E_{EGR}$), as well as other possible engine parameters. This exhaust $O_2$ concentration may be determined as shown in Eqn. 5 and similarly determined for exhaust $NO_x$ concentration as shown in Eqn. 6.

$$E_{O2} = f(E_{fuel}, E_{rpm}, E_{torque}, E_{boost}, E_{EGR}, \text{etc.}) \qquad \text{Eqn. 5}$$

$$E_{NOx} = f(E_{fuel}, E_{rpm}, E_{torque}, E_{boost}, E_{EGR}, \text{etc.}) \qquad \text{Eqn. 6}$$

By substituting Eqn. 5 and 6 into Eqn. 3, the fuel processor fuel rate may be calculated or estimated from engine parameters.

The control strategies described above can be in the form of mathematical expressions in the engine or emissions system control unit or these expressions can be reduced to one or more multidimensional tables, so called look-up tables, stored in the engine control unit. Other system variables such as fuel processor equivalence ratio, length of time the fuel processor is operated in the rich mode, operating temperature of the fuel processor, and other aspects of the fuel processor, can be determined in a similar manner. In utilizing the control strategies hereinabove described, any number of sensors, microprocessors, fuel flow rate regulators, and throttle regulators may be used, all of which are well-known in the art. The present invention may be further understood with reference to the following non-limiting examples.

EXAMPLE 1

A monolithic catalyst was prepared as described in U.S. Pat. No. 5,259,754 to Dalla Betta et. al. Rhodium trichloride was dissolved in deionized water at a concentration of about 0.18 g Rh/cc and then zirconium oxide powder with a surface area of about 75 $m^2$/g was added with stirring. While stirring the mixture, a solution of 20% ammonium hydroxide in water was then added to a pH of 8. The mixture was then evaporated to dryness and the resulting powder calcined in air at 700° C. for 10 hours. The final rhodium concentration was 5.5% Rh by weight on the final catalyst. The Rh/ZrO$_2$ catalyst was slurried with water and a 10% by weight of a 20% zirconium acetated solution to form a slurry of about 30% solids.

A strip of River Lite 20-5Sr from Kawasaki Steel Company with a thickness of 0.050 by 75 mm wide and 3 m length was corrugated to form V-shaped channels across the 75 mm width with the V-channels in a herringbone pattern. The channels were approximately 0.8 mm in height. This foil was treated in air at 900° C. for 10 hours to form a layer of aluminum oxide on the surface. The Rh/ZrO$_2$ slurry was then sprayed onto both sides of the foil to a loading of approximately 6 mg/cm$^2$. The coated catalyst was then calcined in air at 700° C. for an additional 10 hours. The foil section was then folded into two and rolled to form a non-nesting spiral roll with open longitudinal channels. The final catalyst had a diameter of 50 mm and contained about 17 g of catalyst washcoat.

EXAMPLE 2

Figure 8:
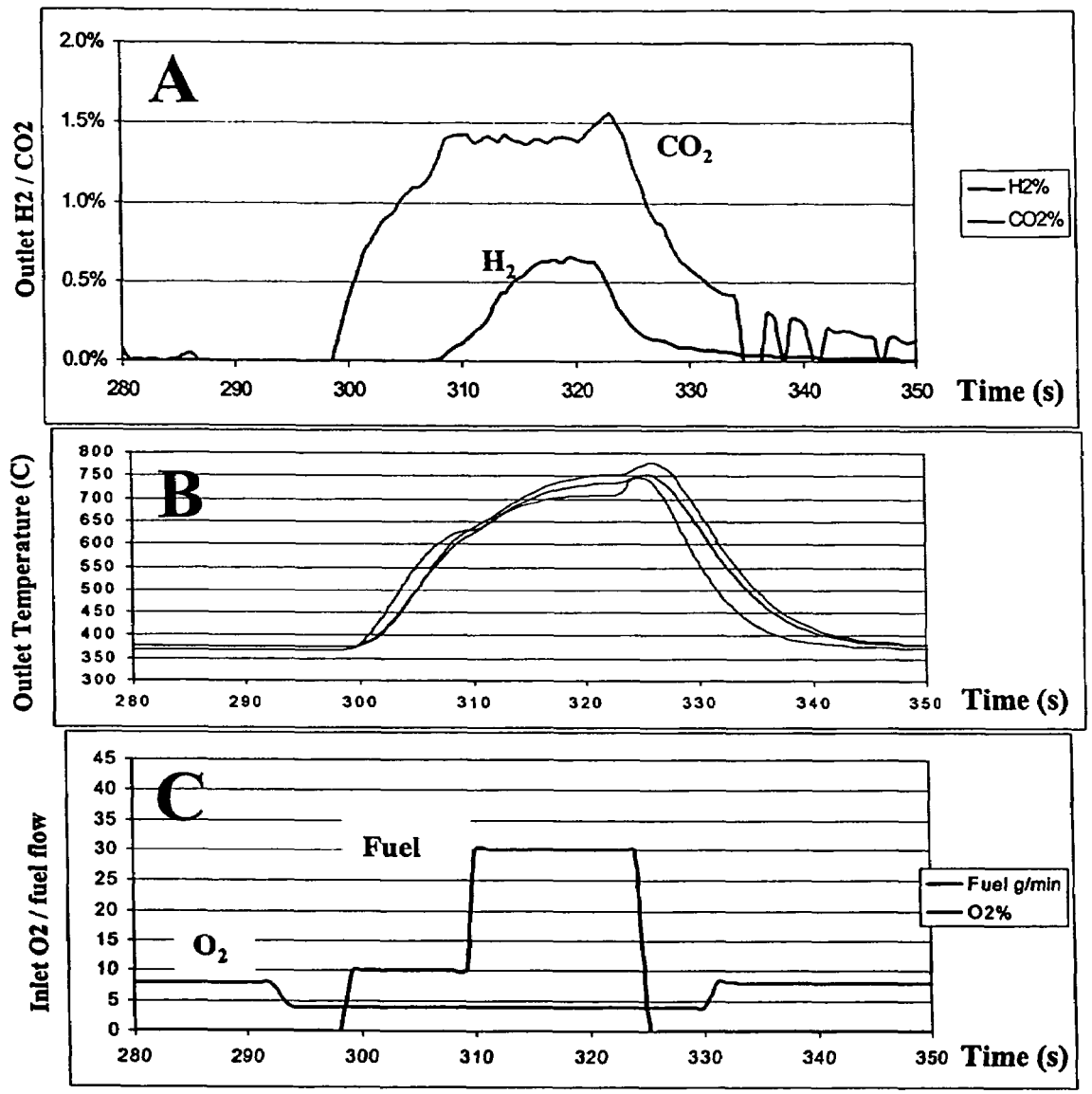
FIG. 8 provides test results indicating rapid heat up and generation of $H_2$ using the present invention.

The catalyst from Example 1 was placed in a flow reactor comprising a gas supply and mass flowmeters for air, nitrogen and helium as a mass spectrometer quantitative tracer, an electric heater, an air assist sprayer for water, a second air assist sprayer for diesel fuel and a static mixer upstream of the catalyst. The catalyst was contained in a 50 mm diameter insulated section with thermocouple temperature sensors upstream and downstream of the catalyst. A sampling probe for a mass spectrometer was located about 50 cm downstream of the catalyst outlet. Air, nitrogen and water flow was adjusted to form a mixer flowing at 800 SLPM (standard liters per minute) with a composition of 5% H$_2$O, 8% O$_2$, 0.3% He and the balance N$_2$. This mixture was then heated to 370° C. using the electric heater. Results of the tests conducted are provided in FIG. 8.

FIG. 8A shows the mass spectrometer signal for H$_2$ and CO$_2$ converted to concentration units of percent by volume. FIG. 8B shows the temperature of the gas at the outlet of the catalyst as measured by three thermocouples placed just downstream of the catalyst at different locations across the outlet face. FIG. 8C shows the concentration of O$_2$ in percent and the fuel flow in g/min as set by the control system. At time equal to 298 seconds, fuel was turned on at 10 gm/minute flow rate. This fuel was combusted on the catalyst and the catalyst temperature rose rapidly as shown by the temperature of the three thermocouples in FIG. 8B. That combustion is occurring was confirmed by the immediate appearance of CO$_2$ as measured by the mass spectrometer as shown in FIG. 8B. At time equal to 309 seconds, the air flow was decreased so that the oxygen concentration at the inlet to the catalyst would drop from 8% to 4% and the fuel flow was increased from 10 g/min to 30 g/min as shown in FIG. 8C. Immediately, H$_2$ appears as measured by the mass spectrometer and indicated in FIG. 8A. At time equals 325 seconds, the fuel flow was terminated and the oxygen level returned to 8%. The CO$_2$ and H$_2$ level rapidly decreased.

These data show that a monolithic catalyst can be designed to rapidly produce H$_2$ and CO from diesel fuel, that the heat up of the catalyst unit can occur in less then 10 s and a desirable reducing agent such as H$_2$ and CO can be produced very rapidly, within 3 to 4 seconds. The entire cyclic process was completed in about 25 seconds.

EXAMPLE 3

Figure 9:
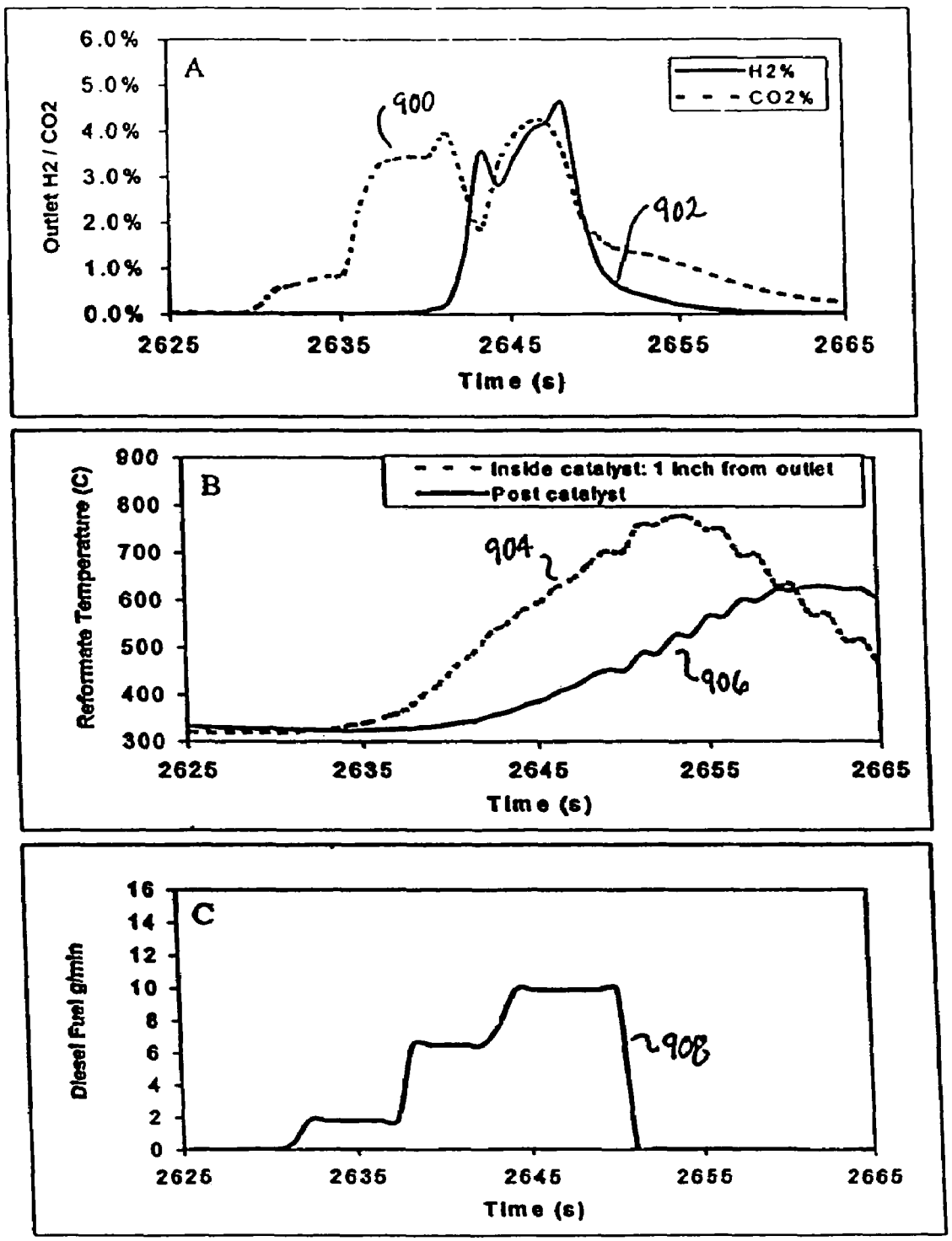
FIG. 9 provides test results indicating rapid heat up and generation of $H_2$ using the present invention with an alternative fuel and engine schedule.

FIG. 9 shows another example of hydrogen pulse generation. The catalyst used in this example was prepared in a manner similar to that of Example 1 with the exception that the metal foil was corrugated to have a channel height of 1.2 mm. Air, nitrogen and water flow was adjusted to form a mixture flowing at 200 SLPM (standard liters per minute) with a composition of 8% H$_2$O, 5% O$_2$, 0.3% He and the balance N$_2$. This mixture was then heated to 300° C. using the electric heater. Graph A shows the mass spectrometer signal for H$_2$ and CO$_2$ converted to concentration units of percent by volume. Graph B shows the temperature of the gas at the outlet of the catalyst 906 and inside the catalyst at one inch from the outlet 904 as measured by two thermocouples. Graph C shows the fuel flow in g/min as set by the control system. At time equal to 2630 seconds, fuel was turned on at 1.8 gm/minute flow rate. This fuel was combusted on the catalyst and the thermocouple near the catalyst inlet rose rapidly. At 2635 seconds, the fuel flow is increased to 6.5 g/min to provide a faster rate of temperature rise as shown by the temperature of the thermocouples in graph B. That combustion is occurring was confirmed by the immediate appearance of CO$_2$ as measured by the mass spectrometer as shown by 900 in graph A. At time equal to 2642 seconds, the fuel flow is increased further to 10 g/min generate a fuel rich exhaust as shown by 908 in graph C. Immediately, H$_2$ appears as measured by the mass spectrometer and indicated by 902 in graph A. At time equals 2650 seconds, the fuel flow was terminated. The CO$_2$ and H$_2$ level rapidly decreased.

EXAMPLE 4

Figure 10:
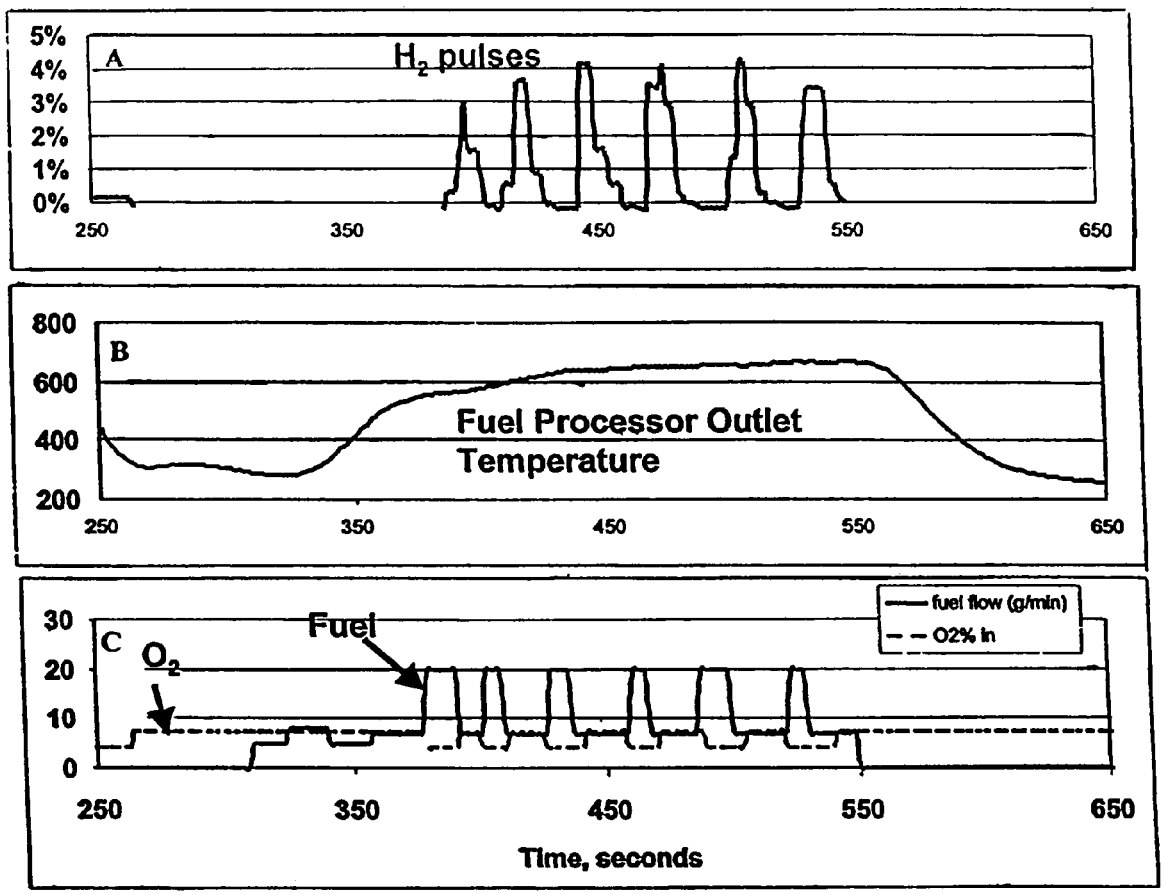
FIG. 10 provides test results using one possible desulfation scheme using the fuel processor of the present invention.

The catalyst of Example 1 was used to demonstrate a possible desufation cycle. Air, nitrogen and water flow was adjusted to form a mixer flowing at 500 SLPM (standard liters per minute) with a composition of 8% H$_2$O, 8% CO$_2$; 7% O$_2$, 0.3% He and the balance N$_2$. This mixture was then heated to 250° C. using the electric heater. As shown in FIG. 10, at approximately 325 seconds fuel was turned on to raise the fuel processor temperature and produce an outlet gas temperature of 500 to 600° C. This high gas temperature will heat the downstream NSR trap catalyst to 500 or 600° C. after a short time period. When the NSR catalyst is at the desired temperature for desulfation, then the exhaust O$_2$ level is decreased and the fuel flow to the fuel processor is increased, 375 seconds in FIG. 10, to obtain an equivalence ratio greater then 1 and to produce H$_2$ and CO to desulfate the NSR catalyst. This reducing condition can be maintained for a long period or the reducing pulses containing H$_2$ and CO can be pulsed as shown in this example. Between pulses, a lower level of fuel is fed to the fuel processor to maintain the fuel processor temperature and the NSR catalyst temperature. When the NSR catalyst is fully desulfated, then the fuel to the fuel processing catalyst is turned off and the outlet gas temperature from the fuel processor drops rapidly.

EXAMPLE 5

Figure 11:
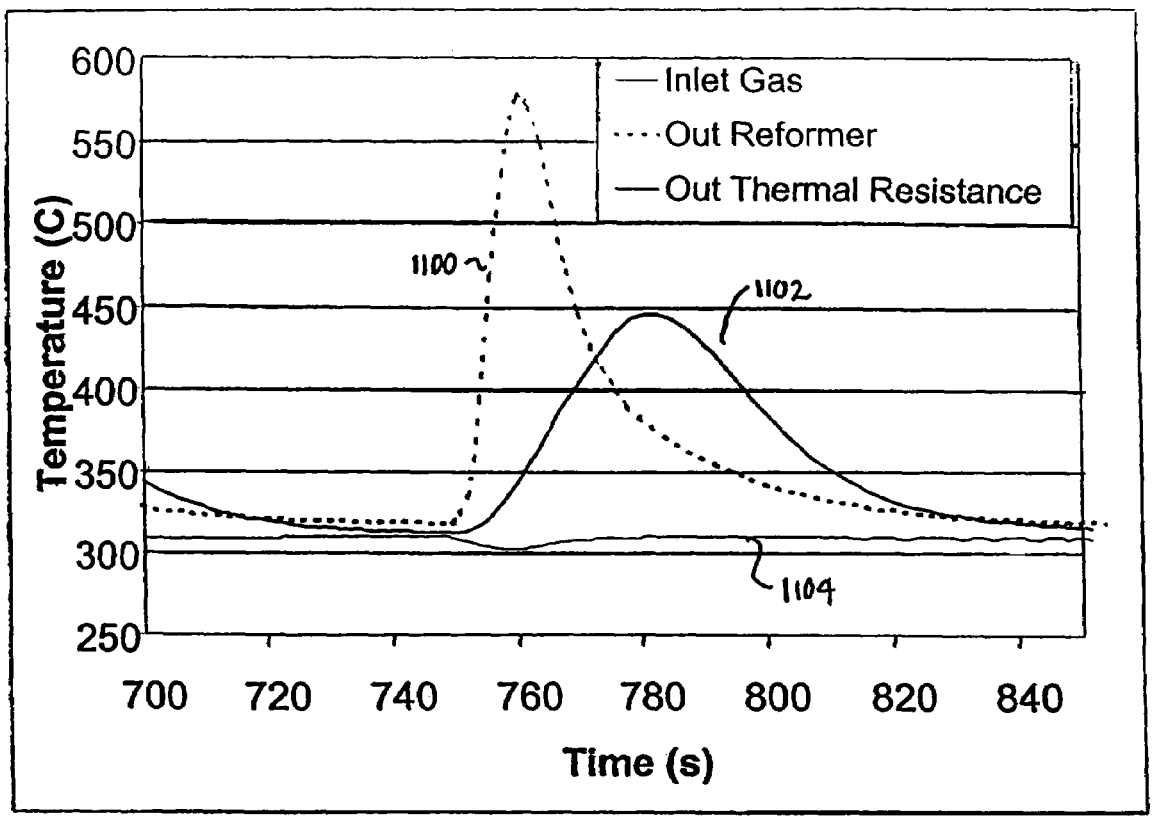
FIG. 11 provides test results indicating rapid heat up and generation of $H_2$ and CO using the present invention with a system containing a thermal mass downstream of the fuel processor.

This example demonstrates the effect of a thermal mass in series downstream of the fuel processor. The same catalyst as in Example 3 was used. The monolithic thermal resistance was assembled from 0.100 inch thick metal foil 100 mm wide and corrugated to form a monolithic structure with a channel height of about 1.5 mm and weighing abut 550 g. This thermal resistance was placed just downstream of the fuel processor catalyst of Example 3 and a thermocouple monitored gas temperatures upstream of the fuel processor catalyst, between the fuel processor catalyst and the thermal mass and downstream of the thermal mass. Air, nitrogen and water flow were adjusted to form a mixture flowing at 600 SLPM (standard liters per minute) with a composition of 8% $H_2O$, 8% $CO_2$; 7% $O_2$, 0.3% He and the balance $N_2$. As shown in FIG. 11, fuel was introduced at 20 g/min for 10 seconds using a pulse type injector operating at 50 hertz frequency with a duty cycle of about 50%. Curve 1100 represents the temperature measured downstream of the reformer and the curve 1102 represents the temperature of the exhaust downstream of the thermal resistance. At 748 seconds, the fuel was introduced. The gas temperature out of the reformer starts rising at 749 seconds and reaches a maximum of 576° C. at 560 seconds (fuel flow was stopped at 758 seconds). At the same time the temperature of the thermal resistance rose much more slowly, reaching 445° C. at 781 seconds due to its larger thermal capacity. This demonstrates that while the fuel processor was heated to 576° C. where it would generate the required reducing $H_2$ and CO, the thermal mass moderated the gas stream temperature so that it rose from 310° C. to about 445° C., an increase of only 135 degrees. This low gas temperature rise and short duration would prevent any significant rise in temperature of the downstream NSR catalyst.

Although illustrative variations of the present invention have been described above, it will be evident to one skilled in the art that various changes and modifications may be made without departing from the invention. It is intended in the following claims to cover all such changes and modifications falling within the true scope and spirit of the invention.

What we claim is:

1. A method of generating reductant in at least a portion of an exhaust stream comprising:
    injecting fuel into the exhaust stream upstream of a fuel processor, wherein the fuel processor comprises an inlet, an outlet, and at least one steam reforming catalyst, and the exhaust stream comprises oxygen, whereby the injection of fuel leaves the exhaust stream overall lean and rapidly increases the temperature of at least a portion of the fuel processor to within the range from about 500° C. to about 750° C.;
    implementing one or a combination of strategies selected from the group consisting of increasing the fuel injection rate, decreasing the oxygen concentration in the exhaust stream, and decreasing the exhaust flow, to obtain rich conditions on at least a portion of the fuel processor catalyst; and
    allowing the fuel and exhaust stream mixture to react within the at least one fuel processor catalyst to generate a reducing gas mixture comprising CO and $H_2$;
    wherein the exhaust upstream from the fuel processor is at a temperature of 300° C. or less and the fuel processor has a thermal mass sufficiently low that at least a portion of the fuel processor heats to within the range from about 500° C. to about 750° C. in 12 seconds or less.

2. The method of claim 1 wherein the fuel processor is operated within a temperature range of about 600° C. to about 750° C.

3. The method of claim 1 wherein the fuel processor comprises at least two distinct catalyst washcoats, at least one washcoat comprising and effect amount of a reforming catalyst and the other washcoat comprising an effective amount of an oxidation catalyst.

4. The method of claim 1 wherein the fuel is injected intermittently.

5. The method of claim 1, wherein the exhaust upstream from the fuel processor is at a temperature of 250° C. or less and the fuel processor has a thermal mass sufficiently low that at least a portion of the fuel processor heats to within the range from about 500° C. to about 750° C. in 10 seconds or less.

6. A method of operating a nitrogen oxide storage-reduction catalyst, comprising:
    treating an exhaust stream by trapping nitrogen oxide from the exhaust stream using the nitrogen oxide storage-reduction catalyst;
    detecting a need to reduce a nitrogen oxide storage amount in the nitrogen oxide storage-reduction catalyst;
    in response to the need, generating reductant in at least a portion of the exhaust stream according to the method of claim 1.

7. The method of claim 1, further comprising
    detecting a temperature of the fuel processor; and
    controlling the temperature of the fuel processor by varying the fuel injection rate.

8. The method of claim 1 wherein the exhaust oxygen concentration is adjusted to a range of about 2% to about 8% during the period when the fuel processor is under rich conditions.

9. The method of claim 8 wherein the oxygen concentration in the exhaust stream is adjusted by changing the rate of exhaust gas recirculation or by throttling the intake engine air flow.

10. The method of claim 1, further comprising:
    regenerating a nitrogen storage reduction catalyst using the reducing gas mixture;
    wherein the regeneration and the fuel processor warm-up are completed in 10 seconds or less.

11. The method of claim 10, wherein the fuel processor temperature is controlled while allowing the fuel and exhaust stream mixture to react within the at least one fuel processor catalyst to generate a reducing gas mixture comprising CO and $H_2$.

* * * * *